(12) United States Patent
Mashue (10) Patent No.: US 8,622,707 B2
(45) Date of Patent: Jan. 7, 2014

(54) ROOT ATTACHMENT FOR A ROTOR BLADE ASSEMBLY

(75) Inventor: Aaron John Mashue, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/329,598

(22) Filed: Dec. 19, 2011

(65) Prior Publication Data

US 2012/0134833 A1   May 31, 2012

(51) Int. Cl.
*F03D 11/02* (2006.01)
(52) U.S. Cl.
USPC .................. 416/204 R; 416/235; 416/239
(58) Field of Classification Search
USPC ............ 416/204 R, 62, 217, 223 R, 228, 232, 416/239, 236 R, 236 A, 240, 244 R, 235, 248
See application file for complete search history.

(56) References Cited

U.S. PATENT DOCUMENTS

| | | | | | |
|---|---|---|---|---|---|
| 2,423,870 | A | * | 7/1947 | Blessing | 428/116 |
| 2,478,252 | A | * | 8/1949 | Dean | 416/147 |
| 2,702,085 | A | * | 2/1955 | Jackson, Jr. | 416/239 |
| 2,718,267 | A | * | 9/1955 | Woolf et al. | 416/239 |
| 2,742,247 | A | * | 4/1956 | Lachmann | 244/130 |
| 5,501,576 | A | * | 3/1996 | Monroe | 416/239 |
| 2007/0040294 | A1 | * | 2/2007 | Arelt | 264/136 |
| 2009/0155084 | A1 | * | 6/2009 | Livingston et al. | 416/223 R |
| 2010/0028162 | A1 | | 2/2010 | Vronsky et al. | |
| 2010/0098552 | A1 | * | 4/2010 | Aarhus | 416/248 |

* cited by examiner

*Primary Examiner* — Nathaniel Wiehe
*Assistant Examiner* — Aaron Jagoda
(74) *Attorney, Agent, or Firm* — Dority & Manning, P.A.

(57) ABSTRACT

A root attachment for a wind turbine rotor blade having a blade root is disclosed. The root attachment may include a wall panel configured to be coupled to the rotor blade at or adjacent to the blade root. The wall panel may define at least a portion of an airfoil shape and may include an inner side and an outer side. In addition, the wall panel may define a non-uniform cross-section between the inner and outer sides.

12 Claims, 7 Drawing Sheets

ROOT ATTACHMENT FOR A ROTOR BLADE ASSEMBLY

FIELD OF THE INVENTION

The present subject matter relates generally to wind turbines and, more particularly, to a root attachment for a wind turbine rotor blade assembly.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

To ensure that wind power remains a viable energy source, efforts have been made to increase energy outputs by modifying the configuration of the rotor blades of a wind turbine. One such modification has been to include aerodynamic enhancement features, such as an airfoil-shaped sleeve or wing, at the blade root of the rotor blade. Specifically, the blade root of a rotor blade is typically cylindrically shaped to facilitate connection of the rotor blade to the hub of the wind turbine, which is not an effective shape capturing energy from the wind. As such, aerodynamic enhancement features may be attached to the rotor blade at the blade root in order to increase the wind capturing capability of the rotor blade.

Typically, conventional aerodynamic enhancement features are attached to the blade root in a cantilevered arrangement, thereby subjecting the airfoil enhancement features to significant deflection and/or loading during operation of the wind turbine. Accordingly, in order to maintain their airfoil shape and/or otherwise avoid material failure, these aerodynamic enhancement features are typically formed from relatively thick walls or shells having a solid, uniform cross-section. As such, the amount of material used to form conventional aerodynamic enhancement features is significantly high, thereby increasing the material costs and weight of such features.

Accordingly, an aerodynamic enhancement feature for a blade root that may be formed from a reduced amount of material while still being capable of withstanding the deflection and/or loading that occurs during operation of a wind turbine would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a rotor blade assembly for a wind turbine. The rotor blade assembly may generally include a rotor blade extending between a blade root and a blade tip. The rotor blade may include a pressure side and a suction side extending between a leading edge and a trailing edge. In addition, the rotor blade assembly may include a root attachment coupled to the rotor blade at or adjacent to the blade root. The root attachment may include a wall panel having an inner side and an outer side, wherein the wall panel defines a non-uniform cross-section between the inner and outer sides.

In another aspect, the present subject is directed to a root attachment for a wind turbine rotor blade having a blade root. The root attachment may include a wall panel configured to be coupled to the rotor blade at or adjacent to the blade root. The wall panel may define at least a portion of an airfoil shape and may include an inner side and an outer side. In addition, the wall panel may define a non-uniform cross-section between the inner and outer sides.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
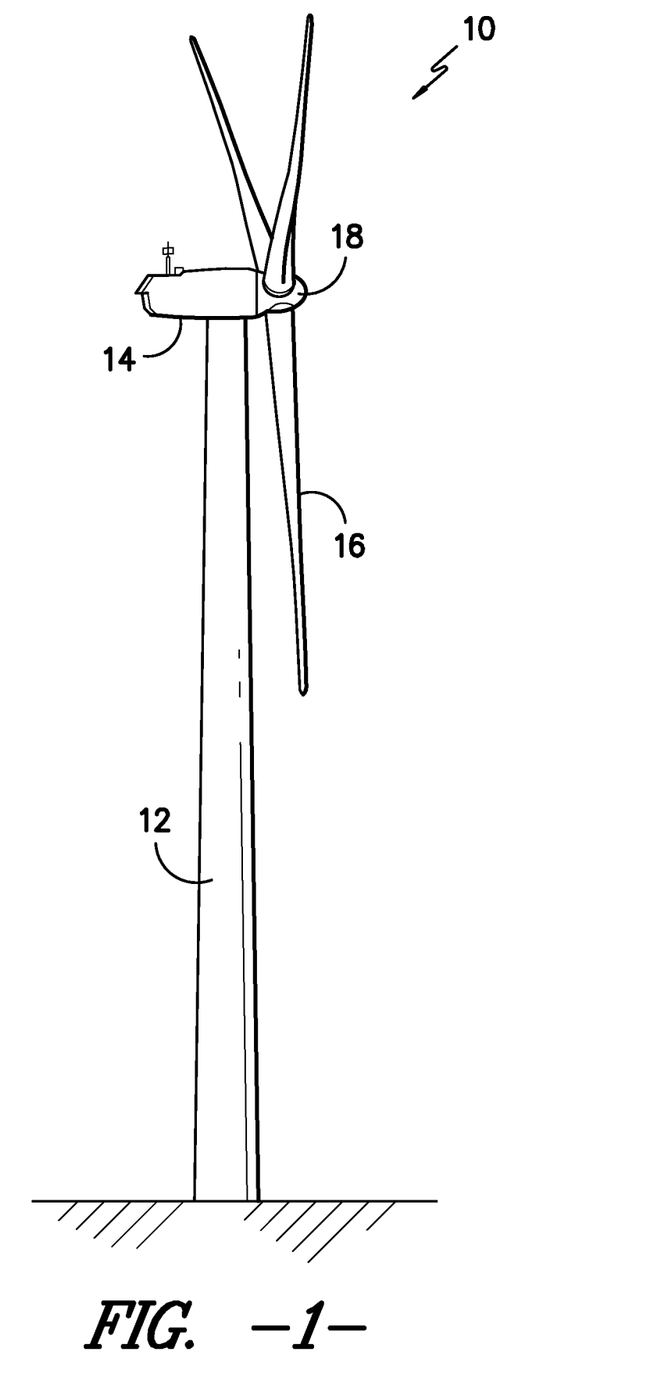
FIG. 1 illustrates a perspective view of one embodiment of a wind turbine.

Referring now to the drawings, FIG. 1 illustrates perspective view of one embodiment of a wind turbine 10. The wind turbine 10 includes a tower 12 with a nacelle 14 mounted thereon. A plurality of rotor blades 16 are mounted to a rotor hub 18, which is, in turn, connected to a main flange that turns a main rotor shaft. The wind turbine power generation and control components are housed within the nacelle 14. It should be appreciated that the wind turbine 10 of FIG. 1 is provided for illustrative purposes only to place the present subject matter in an exemplary field of use. Thus, one of ordinary skill in the art should understand that the present subject matter is not limited to any particular type of wind turbine configuration.

Figure 2:
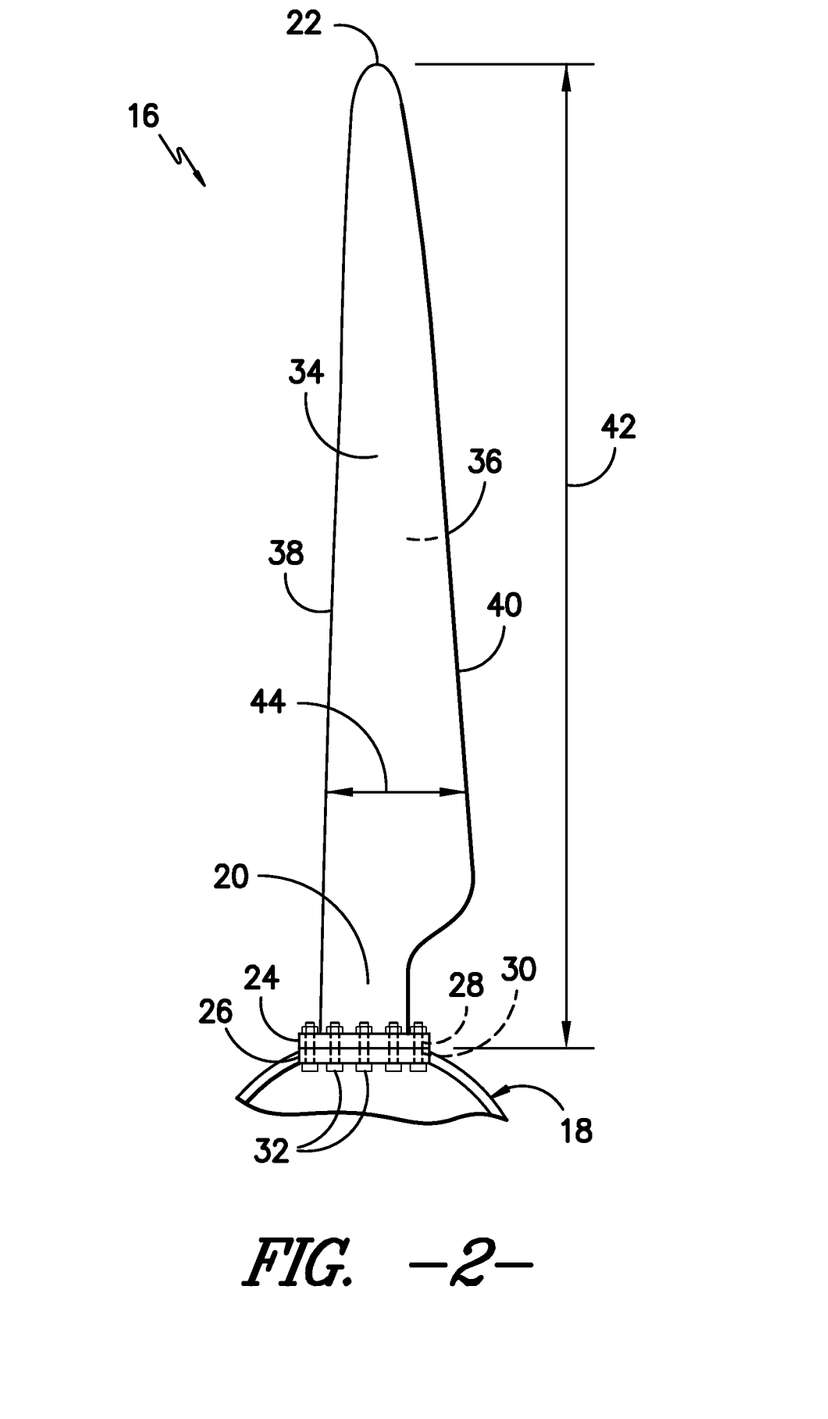
FIG. 2 illustrates a side view of one embodiment of a rotor blade of the wind turbine shown in FIG. 1.

Referring to FIG. 2, there is illustrated a suction side view of one embodiment of one of the rotor blades 16 shown in FIG. 1. The rotor blade 16 generally includes a blade root 20 and a blade tip 22 disposed opposite the blade root 20. The blade root 20 may generally have a substantially cylindrical shape and may be configured as relatively thick and rigid section of the rotor blade 16 so as to withstand the bending moments and other forces generated on the blade 16 during operation of the wind turbine 10. In addition, the blade root 20 may also be configured to be mounted or otherwise attached to the hub 18 of the wind turbine 10. For example, in one embodiment, the blade root 20 may include an outwardly extending blade flange 24 configured to be aligned with and mounted to a corresponding attachment component 26 of the hub 18 (e.g., a pitch bearing or any other suitable load transfer component). In such an embodiments, the blade flange 24 may generally define a plurality of bolt holes 28 having a bolt hole pattern corresponding to the pattern of bolt holes 30 defined in the attachment component 26. Thus, the rotor blade 16 may be rigidly attached to the hub 18 using a plurality of bolts 32 or any other suitable fastening mechanisms and/or devices.

The rotor blade 16 may also generally define any aerodynamic profile or shape. For example, in several embodiments, the rotor blade 16 may define an airfoil shaped cross-section, such as by defining a symmetrical or cambered airfoil shaped cross-section. Thus, rotor blade 16 may include a suction side 34 and a pressure side 36 extending between a leading edge 38 and a trailing edge 40. Further, the rotor blade 16 may have a span 42 defining the total length between the blade root 20 and the blade tip 22 and a chord 44 defining the total length between the leading edge 38 and the trailing edge 40. As is generally understood, the chord 44 may generally vary in length with respect to the span 42 as the rotor blade 16 extends from the blade root 20 to the blade tip 22.

Figure 3:
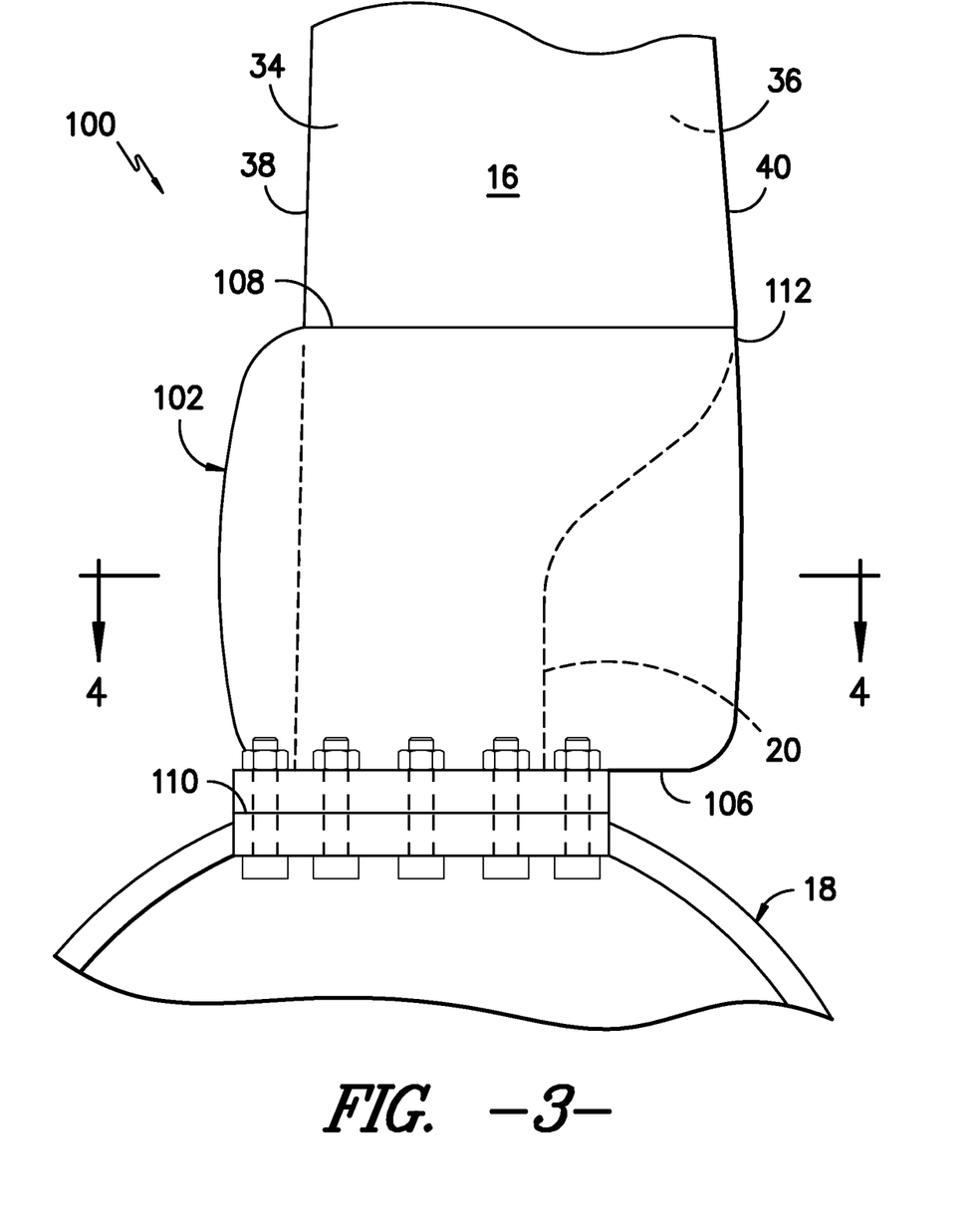
FIG. 3 illustrates a side view of one embodiment of a rotor blade assembly in accordance with aspects of the present subject matter.
Figure 4:
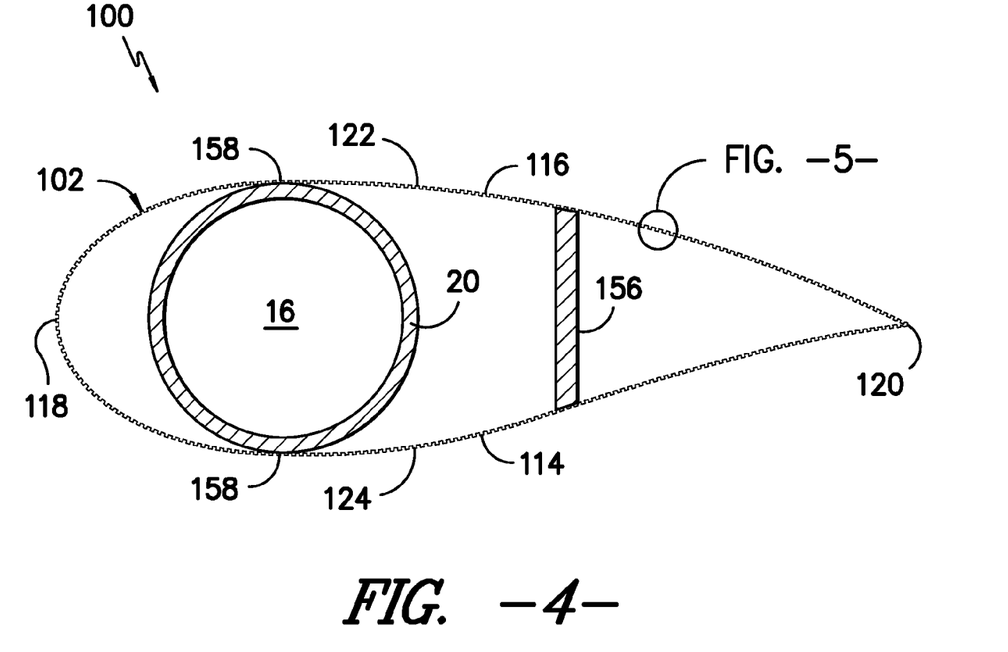
FIG. 4 illustrates a cross-sectional view of the rotor blade assembly shown in FIG. 3 taken about line 4-4, particularly illustrating a root attachment of the rotor blade assembly having one or more wall panels defining a non-uniform cross-section.
Figure 5:
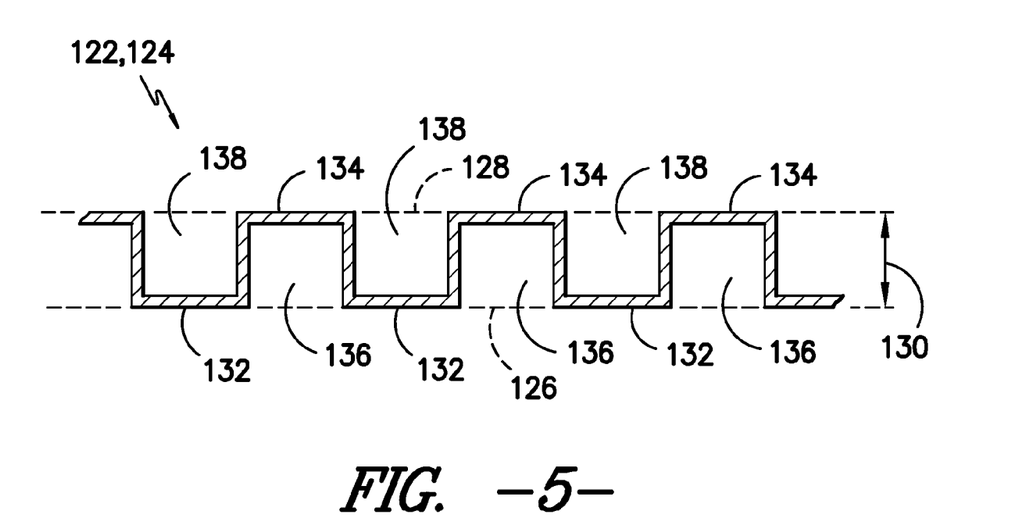
FIG. 5 illustrates an enlarged, cross-sectional view of a portion of the root attachment shown in FIG. 4, particularly illustrating the non-uniform cross-section of the wall panel(s) of the root attachment.

Referring now to FIGS. 3-5, there is illustrated one embodiment of a rotor blade assembly 100 having a root attachment 102 for improving the energy output of a wind turbine 10. In particular, FIG. 3 illustrates a suction side view of one embodiment of the rotor blade assembly 100, particularly illustrating the root attachment 102 coupled to a rotor blade 16 of the rotor blade assembly 100. FIG. 4 illustrates a cross-sectional view of the rotor blade assembly 100 shown in FIG. 3 taken about line 4-4. Additionally, FIG. 5 illustrates an enlarged, cross-sectional view of a portion of the root attachment 102 shown in FIG. 4. It should be appreciated that the rotor blade 16 of the rotor blade assembly 100 may generally be configured as described above with reference to FIG. 2.

In general, the root attachment 102 of the rotor blade assembly 100 may be configured to be coupled to the rotor blade 16 at or adjacent to the blade root 20, thereby providing additional blade area at or adjacent to the blade root 20 for capturing the energy of the wind flowing past the wind turbine 10. For instance, as shown in FIG. 3, in one embodiment, the root attachment 102 may be coupled to the rotor blade 16 so as to extend in a spanwise direction between a first end 106 and a second end 108, with the first end 106 being generally disposed at and/or adjacent to a hub/blade interface 110 defined between the blade root 20 and the hub 18 and the second end 108 being generally disposed at and/or adjacent to a maximum chord location 112 of the rotor blade 16. However, in other embodiments, the root attachment 102 may be configured to extend in a spanwise direction along any other portion of the rotor blade 16. For instance, in alternative embodiments, the first end 106 of the root attachment 102 may be disposed at any other suitable location along the rotor blade 16, such as by being disposed at any location between the interface 110 and the maximum chord location 112. Similarly, the second end 108 of the root attachment 102 may be disposed at any other suitable spanwise location, such as by being disposed at a location outboard or inboard of the maximum chord location 112.

Additionally, in several embodiments, the root attachment 102 may be configured as an aerodynamic enhancement feature for the blade root 16 and, thus, may at least partially define an airfoil shape (e.g., by at least partially defining a symmetrical or cambered airfoil shaped cross-section) so as to improve the overall aerodynamic efficiency of the rotor blade assembly 100. For instance, as shown in FIG. 4, the root attachment 102 may be configured as a sleeve designed to encase or surround the portion of the rotor blade 16 disposed at and/or adjacent to the blade root 20. In such an embodiment, the root attachment 102 may generally define a complete airfoil shaped cross-section and may include a pressure side 114 and a suction side 116 extending between a leading edge 118 and a trailing edge 120. However, in other embodiments, the root attachment 102 may be configured to define only a portion of an airfoil shape. For example, as will be described below with reference to FIG. 12, the rotor blade assembly 100 may include a root attachment(s) 301, 302 defining only a leading edge portion or a trailing edge portion of an airfoil shape.

As particularly shown in FIGS. 4 and 5, in several embodiments, the root attachment 102 may be formed by one or more wall panels 122, 124 generally defining the outer shell or skin of the root attachment. For instance, as shown in the illustrated embodiment, the root attachment 102 may include a first wall panel 122 generally forming the pressure side 114 of the airfoil shape defined by the root attachment 102 and a second wall panel 124 generally forming the suction side 116 of the airfoil shape defined by the root attachment 102, with the first and second wall panels 122, 124 being coupled to one another at the leading and trailing edges 118, 120 of the root attachment 102. In another embodiment, the first and second wall panels 122, 124 may be configured to form any other suitable portion of the overall shape of the root attachment 102, such as by configuring the first wall panel 122 to form the portion of the root attachment 102 extending outward from the blade root 20 towards the leading edge 118 and by configuring the second wall panel 124 to form the portion of the root attachment 102 extending outwardly from the blade root 20 towards the trailing edge 120. Moreover, in further embodiments, the root attachment 102 may be formed by a single, continuous wall panel, by two wall panels as described above or by three or more wall panels coupled together to form the overall shape of the root attachment 102.

As particularly shown in FIG. 5, each wall panel 122, 124 of the root attachment 102 may include an inner side 126 and an outer side 128. Additionally, each wall panel 122, 124 may define a wall thickness 130 between its inner and outer sides 126, 128. In general, the inner side 126 of each wall panel 122, 124 may be defined by the inner perimeter formed by the innermost points and/or surfaces of each wall panel 122, 124 and the outer side 128 of each wall panel 122, 124 may be defined by the outer perimeter formed by the outermost points and/or surfaces of each wall panel 122, 124. For instance, as shown in the illustrated embodiment, the inner side 126 is defined by a continuous boundary line extending generally tangent to and/or connecting the innermost points and/or surfaces 132 of the illustrated wall panel 122. Similarly, the outer side 128 is defined by a continuous boundary line extending generally tangent to and/or connecting the outermost points and/or surfaces 134 of the wall panel 122. Thus, in such an embodiment, the wall thickness 130 at any point along the wall panel 122 may generally be defined between such boundary lines.

Moreover, in accordance with several embodiments of the present subject matter, each wall panel 122, 124 may generally define a non-uniform cross-section between its inner and outer sides 126, 128. Specifically, instead of having a solid or uniform cross-section between the inner and outer sides 126, 128, each wall panel 122, 124 may include gaps, openings, channels, hollow portions and/or the like within the area defined between its inner and outer sides 126, 128. For instance, in a particular embodiment of the present subject matter, at least a portion of each wall panel 122, 124 may define a corrugated cross-sectional shape between its inner and outer sides 126, 128.

By configuring each wall panel 122, 124 to have a non-uniform cross-section between its inner and outer sides 126, 128, the disclosed wall panels 122, 124 may be capable of handling deflections and/or stresses more efficiently than wall panels having a solid or uniform cross-section. For instance, the non-uniform cross-section may provide an increase in the second moment of inertia of each wall panel 122, 124, thereby creating stiffer wall panels 122, 124 that are capable of resisting increased deflection (e.g., due to the wind forces acting on the root attachment 102). In addition, by utilizing a non-uniform cross-section, at least a portion of the material forming each wall panel 122, 124 may be moved away from the wall panel's neutral bending axis. Accordingly, such material may be equipped with a greater mechanical advantage to handle loads (e.g., bending loads), thereby reducing the stresses acting on each wall panel 122, 124. Moreover, such an increased capability to handle deflections and/or stresses may be achieved with a reduction in the amount of material required to form each wall panel 122, 124. As such, the material cost for producing each wall panel 122, 124, as well as the overall weight of each wall panel 122, 124, may be reduced. This reduction in material also results in the root attachment having less mass, thereby reducing the amount of loads that would otherwise be transmitted into the rotor blade 16 as a result of the root attachment 102.

In general, it should be appreciated that any suitable non-uniform cross-section may be defined between the inner and outer sides 126, 128 of each wall panel 122, 124. For instance, as indicated above, in several embodiments, each wall panel 122, 124 may define a corrugated cross-sectional shape. However, in other embodiments, each wall panel 122, 124 may define any other suitable non-uniform cross-section between its inner and outer sides 126, 128.

As particularly shown in FIG. 5, in several embodiments, at least a portion of each wall panel 122, 124 may be configured as an undulating or channeled wall and, thus, may define a plurality of alternating channels 136, 138 between its inner and outer sides 126, 128. Specifically, each wall panel 122, 124 may define a plurality of inner channels 136 having an open end along the inner side 126 of the wall panel 122, 124 and a plurality of outer channels 138 having open end along the outer side 128 of the wall panel 122, 124, with the inner and outer channels 136, 138 alternating along the length of the wall panel 122, 124.

Figure 6:
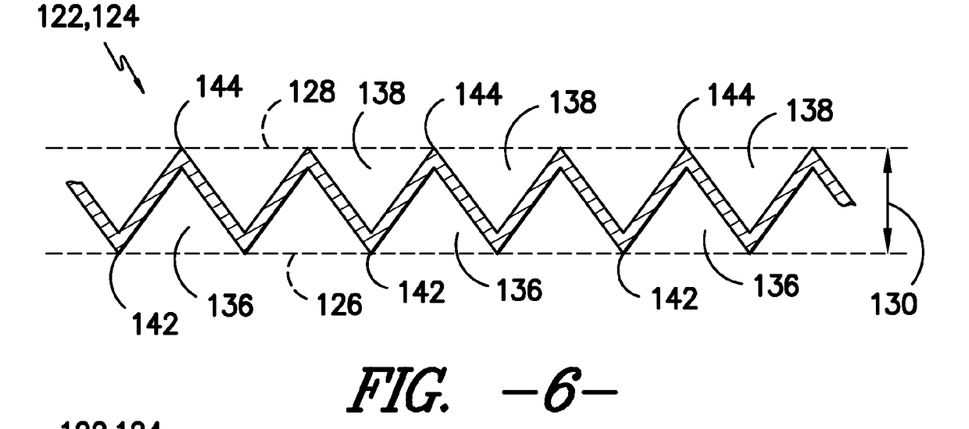
FIG. 6 illustrates an enlarged, cross-sectional view of another embodiment of a wall panel having a non-uniform cross-section.
Figure 7:
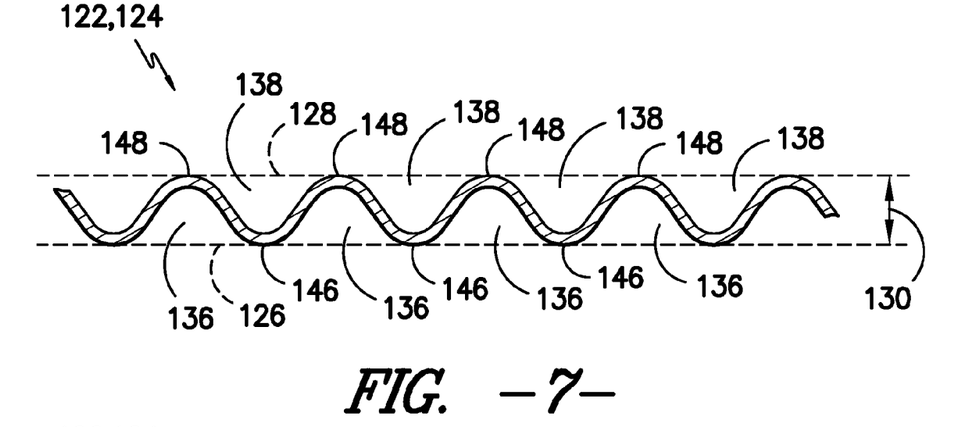
FIG. 7 illustrates an enlarged, cross-sectional view of a further embodiment of a wall panel having a non-uniform cross-section.

In general, the alternating channels 136, 138 defined by each wall panel 122, 124 may have any suitable shape. For instance, as shown in FIG. 5, the channels 136, 138 are formed between substantially parallel oriented segments of each wall panel 122, 124 such that each channel 136, 138 defines a generally rectangular shape. However, in other embodiments, the channels 136, 138 may define any other suitable shape. For instance, in the embodiment shown in FIG. 6, each wall panel 122, 124 may be configured so as to define a plurality of alternating channels 136, 138 between its inner and outer sides 126, 128 that have a generally triangular shape. Specifically, in such an embodiment, the portions of the wall panels 122, 124 forming the sides of each channel 136, 138 may extend diagonally between alternating ridges 142, 144 that, when connected by a boundary line, generally define the inner and outer sides 126, 128 of each wall panel 122, 124, respectively. In another embodiment, each wall panel 122, 124 may be configured so as to define a plurality of alternating channels 136, 138 between its inner and outer sides 126, 128 that have a generally arcuate or semi-elliptical shape. In particular, as shown in FIG. 7, each wall panel 122, 124 may define a curved or wavy pattern such that the inner channels 136 are defined between adjacent valleys 146 that, when connected by a boundary line, generally define the inner side 126 of each wall panel 122, 124 and the outer channels 138 are defined between adjacent peaks 148 that, when connected by a boundary line, generally define the outer side 128 of each wall panel 122, 124.

Figure 8:
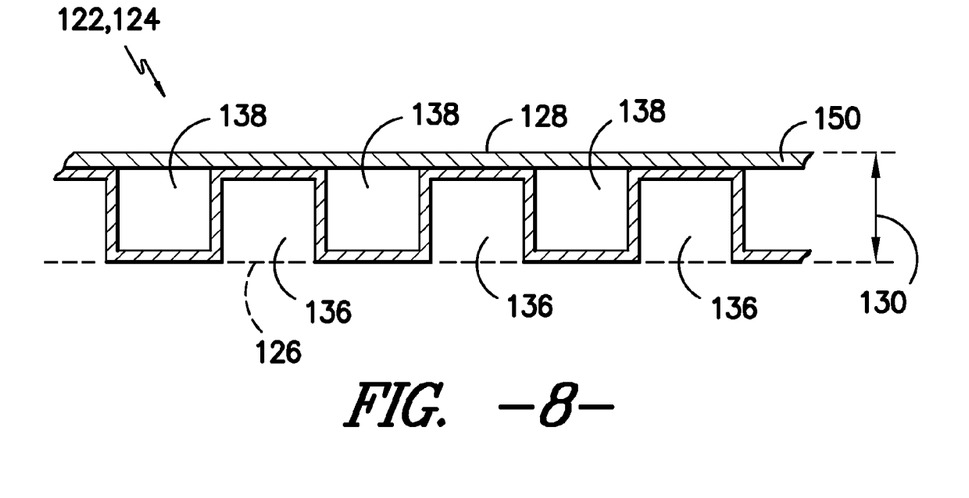
FIG. 8 illustrates an enlarged, cross-sectional view of yet another embodiment of a wall panel having a non-uniform cross-section.

Moreover, in embodiments in which at least a portion of each wall panel 122, 124 is configured as an undulating or channeled wall and, thus, defines a plurality of alternating channels 136, 138, the disclosed wall panels 122, 124 may also include one or more additional components and/or features designed to enhance the overall aerodynamic performance of the root attachment 102. For instance, as shown in FIG. 8, in one embodiment, each wall panel 122, 124 may include an outer sidewall 150 covering the outer channels 138. Specifically, the outer sidewall 150 may be configured as a cover layer extending over the outer channels 148 and may include a generally continuous, outer surface defining the outer side 128 of each wall panel 122, 124. As such, each wall panel 122, 124 may define a smooth, aerodynamic surface along its outer side 128, thereby improving the capability of the root attachment 102 to capture energy from the wind.

It should be appreciated that, in addition to the outer sidewall 150 shown in FIG. 8 or as an alternative thereto, each wall panel 122, 124 may include an inner sidewall (not shown) covering the inner channels 136 and generally defining the inner side 126 of the wall panels 122, 124. It should also be appreciated that the outer sidewall 150 may be formed integrally with the channeled portion of each wall panel 122, 124 or the outer sidewall 150 may be configured as a separate component configured to be separately mounted to the channeled portion of each wall panel 122, 124. For instance, in one embodiment, the outer sidewall 150 may be formed over the channeled portion of each wall panel 122, 124, such as by using a wet lay-up process to form the outer sidewall over the channeled portion or by using a shrink-wrapping process to form the outer sidewall over the channeled portion.

Figure 9:
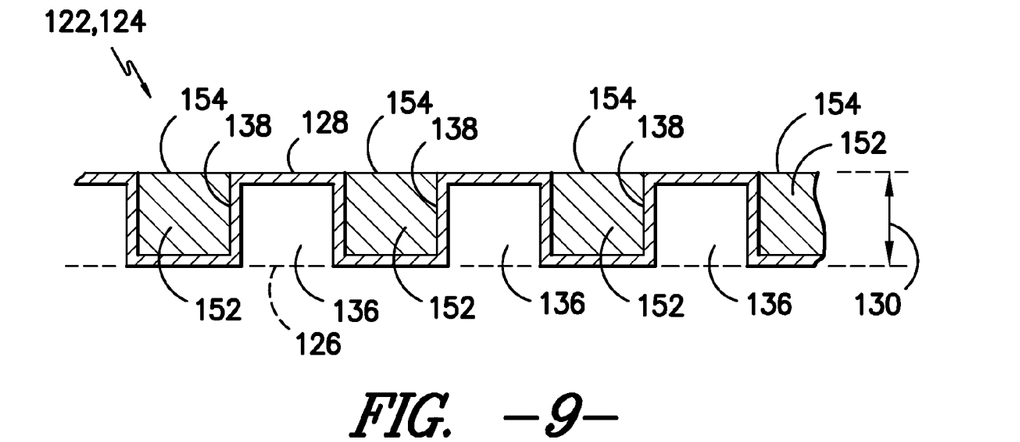
FIG. 9 illustrates an enlarged, cross-sectional view of an even further embodiment of a wall panel having a non-uniform cross-section.

In another embodiment, shown in FIG. 9, each wall panel 122, 124 may include a filler material 152 disposed within the outer channels 138. Specifically, as shown in the illustrated embodiment, the filler material 152 may be disposed within each outer channel 138 such that an outer surface 154 of the filler material 152 is generally aligned with and/or tangent to the outer side 128 of each wall panel 122, 124. As such, a generally continuous and smooth aerodynamic surface may be defined along the outer side 128 of each wall panel 122, 124.

It should be appreciated that, in addition to the filling each of the outer channels 138 with the filler material 152 or as an alternative thereto, the filler material 152 may be disposed within the inner channels 136. Additionally, it should be appreciated that the filler material 152 may generally comprise any suitable material. For instance, in several embodiments, the filler material 152 may comprise a relatively lightweight material, such as a cork material, an adhesive and/or the like.

Referring back to FIG. 4, it should be appreciated that, in several embodiments, the root attachment 102 may also include one or more support members 156 configured to provide structural support (e.g., increased stiffness) to the wall panels 122, 124. For example, as shown in FIG. 4, the root attachment 102 may include one or more support members 156 extending between the inner sides 126 of the wall panels 122, 124. In another embodiment, the root attachment 102 may include one or more support members 156 extending between the rotor blade 16 and one or more of the wall panels 122, 124, such as by coupling one or more support member(s) 156 between the blade root 20 and the inner side(s) 126 of the wall panel(s) 122, 124.

Figure 10:
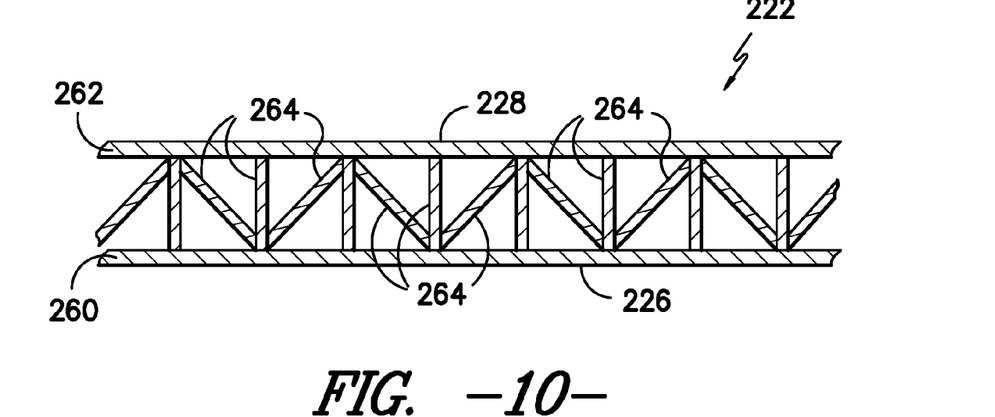
FIG. 10 illustrates an enlarged, cross-sectional view of another embodiment of a wall panel having a non-uniform cross-section.
Figure 11:
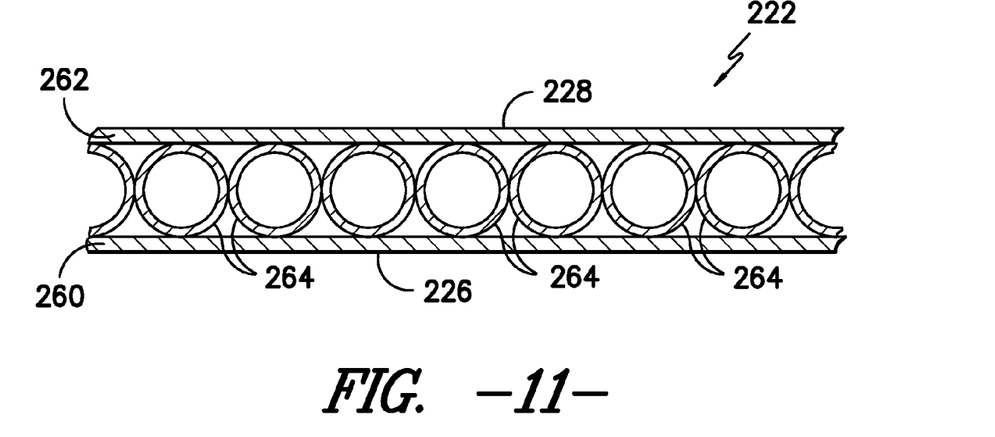
FIG. 11 illustrates an enlarged, cross-sectional view of a further embodiment of a wall panel having a non-uniform cross-section.

Referring now to FIGS. 10 and 11, further embodiments of suitable wall panels 222 that may be utilized to form the disclosed root attachment 102 are illustrated in accordance with aspects of the present subject matter. As shown, each wall panel 222 generally includes an inner sidewall 260 defining the inner side 226 of the wall panel 222, an outer sidewall 262 defining the outer side 228 of the wall panel 222 and a plurality of connection members 264 extending between the inner and outer sidewalls 260, 262. In general, the connection members 264 may be configured to extend between the inner and outer sidewalls 260, 262 such that the wall panel 222 defines a non-uniform cross-section between its inner and outer sides 226, 228. For instance, the connection members 264 may be spaced apart from one another or may have a particular shape such that gaps, openings and/or the like are defined between the inner and outer sides 226, 228 of the wall panel 222.

In several embodiments, the connection members 264 may be configured as separate wall segments extending between the inner and outer sidewalls 260, 262. For instance, as shown in FIG. 10, the connection members 264 may comprise separate wall segments extending both diagonally and perpendicularly between the inner and outer sidewalls 260, 262. However, in other embodiments, the connection members 264 may be configured to extend only diagonally or only perpendicularly between the inner and outer sidewalls 260, 262. Additionally, as shown in the illustrated embodiment, the connection members 264 comprise relative straight wall segments and, thus, extend linearly between the inner and outer sidewalls 260, 262. However, in alternative embodiments, the connection members 264 may be arcuate and, thus, may extend along a curved path between the inner and outer sidewalls 260, 262.

Moreover, in several embodiments, the connection members 264 may define closed or open shapes between the inner and outer sidewalls 260, 262. For instance, as shown in FIG. 11, in one embodiment, each connection member 264 generally defines a circular cross-sectional shape. However, in other embodiments, the connection members 264 may be configured to define any other suitable shape between the inner and outer sidewalls 260, 262, such as a triangular shape, a rectangular shape, a semi-circular shape, a honey-comb shape and/or the like.

Figure 12:
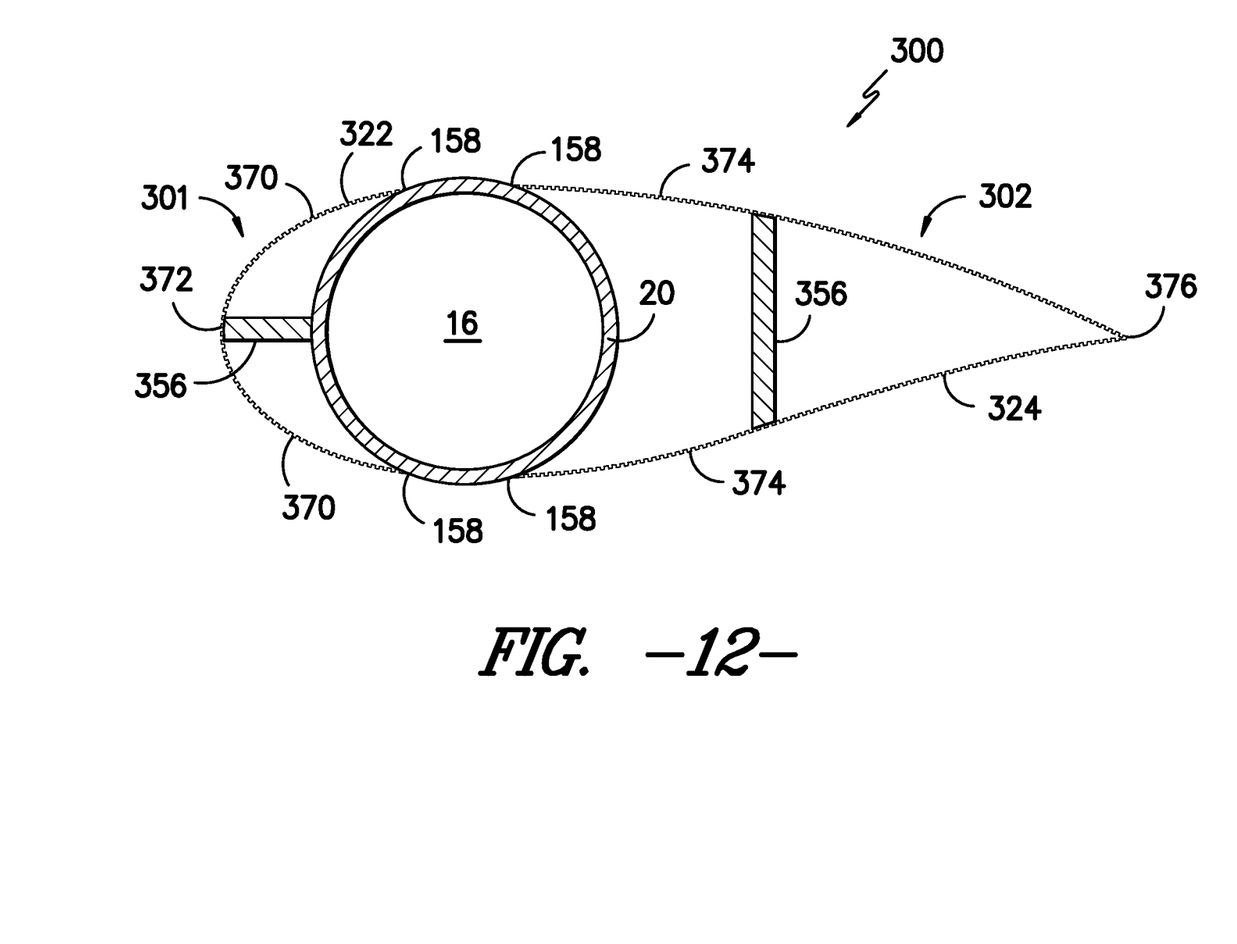
FIG. 12 illustrates a cross-sectional view of another embodiment of rotor blade assembly in accordance with aspects of the present subject matter, particularly illustrating the rotor blade assembly including two separate root attachments.

Referring now to FIG. 12, there is illustrated a cross-sectional view of another embodiment of a rotor blade assembly 300 in accordance with aspects of the present subject matter. As shown in FIG. 12, unlike the embodiment described above with reference to FIGS. 3 and 4, the rotor blade assembly 300 includes separate root attachments 301, 302 coupled to the rotor blade 16 in a cantilevered arrangement at and/or adjacent to the blade root 20. In general, each root attachment 301, 302 may be configured to define a portion of an airfoil shape. Specifically, as shown, the rotor blade assembly 300 includes a first root attachment 301 generally defining a leading edge portion of an airfoil shape and a second root attachment 302 generally defining a trialing edge portion of an airfoil shape. As such, when the first and second root attachments 301, 302 are coupled to the rotor blade 16, a substantially continuous airfoil shape may be defined at and/or adjacent to the blade root 20.

As shown in FIG. 12, the first root attachment 301 may generally be formed by one or more wall panels 322 coupled to and extending outwardly from the rotor blade 16 so as to define a leading edge portion of an airfoil shape. Specifically, the wall panel(s) 322 may have a generally have an arcuate shape so as to define curved walls 370 (corresponding to portions of the pressure and suction sides of an airfoil shape) extending outwardly towards a leading edge 372. Similarly, the second root attachment 302 may generally be formed by one or more wall panels 324 coupled to and extending outwardly from the rotor blade 16 so as to define a trailing edge portion of an airfoil shape. Specifically, the wall panel(s) 324 may be configured to extend outwardly from the rotor blade 16 so as to define a converging shape with walls 374 (corresponding to portions of the pressure and suction sides of an airfoil shape) that intersect at a trailing edge 376.

It should be appreciated that the wall panel(s) 322, 324 of the first and second root attachments 301, 302 may generally be configured the same as or similar to the wall panel(s) 122, 124, 222 described above with reference to FIGS. 4-11. Thus, each wall panel 322, 324 may define a non-uniform cross-section between its inner and outer sides (not shown). For instance, in several embodiments, each wall panel 322, 324 may define a corrugated cross-sectional shape between its inner and outer sides.

Additionally, it should be appreciated that, in alternative embodiments, the illustrated rotor blade assembly 300 need not include both the first and second root attachments 301, 302. For instance, in one embodiment, the rotor blade assembly 300 may only include the first root attachment 301 such that only a leading edge airfoil portion is formed at and/or adjacent to the blade root 20 of the rotor blade 16. In another embodiment, the rotor blade assembly 300 may only include the second root attachment 302 such that only a trailing edge airfoil portion is formed at and/or adjacent to the blade root 20 of the rotor blade 16.

Moreover, similar to the embodiments described, the root attachments 301, 302 may also include one or more support members 356 configured to provide structural support (e.g., increased stiffness) to the wall panel(s) 322, 324. For instance, as shown in FIG. 12, the first root attachment 301 includes a support member 356 extending between the rotor blade 16 and the wall panel(s) 322. Similarly, the second root attachment 302 includes a support member 356 extending between the inner sides of the wall panel(s) 324.

It should be appreciated that the disclosed root attachments 102, 301, 302 may be configured to be coupled to the rotor blade 16 at and/or adjacent to the blade root 20 using any suitable attachment method and/or means known in the art. For example, in one embodiment, the wall panel(s) 122, 124, 222, 322, 324 of each root attachment 102, 301, 302 may be adhered to the rotor blade 16 using a suitable adhesive, such as by adhering the wall panel(s) 122, 124, 222, 322, 324 to the rotor blade 16 at attachment points 158 (FIGS. 4 and 12) defined at the interface between the wall panel(s) 122, 124, 222, 322, 324 and the rotor blade 16. In another embodiment, the wall panel(s) 122, 124, 222, 322, 324 may be coupled to the rotor blade 16 using suitable mechanical fasteners, such as by coupling the wall panels 122, 124, 222, 322, 324 to the rotor blade 16 at the attachment points 158 using bolts, screws, pins, rivets, brackets, tongue and groove fittings and/or the like. In a further embodiment, the wall panel(s) 122, 124, 222, 322, 324 may be coupled to the rotor blade 16 using a wet lay-up process (e.g., by laying-up composite strips over the seam defined between the wall panel(s) 122, 124, 222, 322, 324 and the rotor blade 16 at the attachment points 158). In yet another embodiment, the wall panel(s) 122, 124, 222, 322, 324 may be coupled to the rotor blade 16 using a shrink wrapping process and/or by using any other suitable attachment method and/or means known in the art.

It should also be appreciated that the disclosed wall panel(s) 122, 124, 222, 322, 324 and support members 156, 356 may be formed from any suitable material and/or using any suitable manufacturing process. For instance, in several embodiments, the wall panels 122, 124, 222, 322, 324 and/or support member(s) 156, 356 may be formed from a suitable composite material, such as a fiber reinforced composite material, using a molding and/or infusion process. In another embodiment, wall panels 122, 124, 222, 322, 324 and/or support member(s) 156, 356 may be formed from any other material, such as a metal material (e.g., a sheet metal), a thermoplastic material and/or the like and/or any other manufacturing process (e.g., a casting and/or a stamping process).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A root attachment for a wind turbine rotor blade having a blade root, the root attachment comprising:
   a wall panel configured to be coupled to the rotor blade at or adjacent to the blade root, the wall panel defining at least a portion of an airfoil shape and including an inner side and an outer side,
   wherein the wall panel defines a plurality of outer channels along the outer side and a plurality of inner channels along the inner side, the wall panel including a filler material disposed within the plurality of outer channels,
   wherein the plurality of outer channels and the plurality of inner channels are alternated along a length of the wall panel such that each pair of adjacent outer channels is separated by an inner channel.

2. The root attachment of claim 1, wherein the filler material is disposed within the plurality of outer channels such that a generally continuous surface is formed along the outer side of the wall panel.

3. A rotor blade assembly for a wind turbine, the rotor blade assembly comprising:
   a rotor blade extending between a blade root and a blade tip, the rotor blade including a pressure side and a suction side extending between a leading edge and a trailing edge; and
   a root attachment coupled to the rotor blade at or adjacent to the blade root, the root attachment including a wall panel having an inner side and an outer side,
   wherein the wall panel defines a plurality of outer channels along the outer side and a plurality of inner channels along the inner side, the wall panel including a filler material disposed within the plurality of outer channels,
   wherein the plurality of outer channels and the plurality of inner channels are alternated along a length of the wall panel such that each pair of adjacent outer channels is separated by an inner channel.

4. The rotor blade assembly of claim 3, wherein the plurality of outer channels and the plurality of inner channels define at least one of a rectangular shape, a triangular shape and an acruate shape.

5. The rotor blade assembly of claim 3, wherein the filler material is disposed within the plurality of outer channels such that a generally continuous surface is formed along the outer side of the wall panel.

6. A root attachment for a wind turbine rotor blade having a blade root, the root attachment comprising:
   a wall panel configured to cover at least a portion of an outer circumference of the blade root, the wall panel defining at least a portion of an airfoil shape and including an inner side and an outer side, the outer side being defined by an outermost surface of the wall panel, the wall panel defining a plurality of outer channels along the outer side and a plurality of inner channels along the inner side,
   wherein the plurality of outer channels are uncovered along the outer side.

7. The root attachment of claim 6, wherein the root attachment forms a leading edge portion of an airfoil shape.

8. The root attachment of claim 6, wherein the root attachment forms a trailing edge portion of an airfoil shape.

9. The root attachment of claim 6, wherein the root attachment forms a complete airfoil shape.

10. The root attachment of claim 6, wherein the plurality of outer channels and the plurality of inner channels are alternated along a length of the wall panel such that each pair of adjacent outer channels is separated by an inner channel.

11. The root attachment of claim 6, wherein the plurality of outer channels and the plurality of inner channels define at least one of a rectangular shape, a triangular shape and an acruate shape.

12. The root attachment of claim 6, wherein the inner side is defined by an innermost surface of the wall panel, the plurality of inner channels being uncovered along the inner side.

* * * * *